United States Patent [19]

Hartness et al.

[11] Patent Number: 4,513,878
[45] Date of Patent: Apr. 30, 1985

[54] CARTON FEEDING APPARATUS

[75] Inventors: Thomas S. Hartness; Thomas P. Hartness, both of Greenville, S.C.

[73] Assignee: Hartness International, Inc., Greenville, S.C.

[21] Appl. No.: 480,103

[22] Filed: Mar. 29, 1983

Related U.S. Application Data

[63] Continuation-in-part of Ser. No. 205,194, Nov. 10, 1980, Pat. No. 4,392,586.

[51] Int. Cl.³ .............................................. B65H 3/08
[52] U.S. Cl. ...................................... 221/40; 221/41; 221/210; 221/213
[58] Field of Search ...................... 221/33, 36, 39-41, 221/210, 211, 213, 214-216; 53/48; 414/125, 128, 330

[56] References Cited

U.S. PATENT DOCUMENTS

| | | | |
|---|---|---|---|
| 3,077,287 | 2/1963 | White | 221/210 |
| 3,275,189 | 9/1966 | Goldsborough et al. | 221/211 X |
| 4,231,209 | 11/1980 | Walker et al. | 53/48 |

FOREIGN PATENT DOCUMENTS

| | | | |
|---|---|---|---|
| 1417596 | 10/1965 | France | 221/211 |
| 922969 | 4/1963 | United Kingdom | 221/36 |
| 1012639 | 12/1965 | United Kingdom | 221/211 |

*Primary Examiner*—Charles A. Marmor
*Attorney, Agent, or Firm*—Dority & Manning

[57] ABSTRACT

An apparatus for feeding cartons in succession from a stack of cartons carried in an elongated chute onto a receiving chute. The apparatus includes a support member which has a plurality of picker fingers carried thereon. The support member is moved from a carton grasping position to a carton release position. When the support member is moved to the carton grasping position, picker fingers including power-operated cylinders having enlarged gripping heads provided on the end of the piston thereof are activated for retracting the heads for grasping the edge of the last carton in the stack for lifting said carton above an abutment and allowing the carton to drop into the receiving chute when said support member is moved back to the depositing position.

8 Claims, 8 Drawing Figures

CARTON FEEDING APPARATUS

This application is a continuation-in-part application of application Ser. No. 06/205,194 filed on Nov. 10, 1980 (issued as U.S. Pat. No. 4,392,586 on July 12, 1984).

BACKGROUND OF THE INVENTION

In recent years, articles such as bottles have been secured with cartons in groups within a case. In one particular application, the case contains twenty-four bottles, and four plastic cartons are forced down over the top of the bottles so that each of the cartons secures six bottles together. The cartons are provided with holes in the main body portion which are inserted over the tops or necks of the bottles and, when pressed down over the bottles, firmly grip the bottles and hold them in packages. Finger openings are also provided in the main body portion of the cartons so that the packages can be readily removed from the case. In most operations, the cases are cardboard boxes, however, they may be constructed of any conventional materials such as plastic or wood. Heretofore, the cartons were positioned in stacks adjacent one end of the machine and vacuum gripping devices were utilitzed for gripping two of the cartons simultaneously from adjacent stacks and placing them onto a chute that carries the cartons to the bottles. One problem with such vacuum devices is that sometimes a positive grip is not obtained and the cartons are dropped while they are being moved to the chute that carries them to the bottles, or are not pulled from the stack. Furthermore, if there is not a firm and positive gripping relationship between the vacuum mechanism and the carton, the carton would tend to slip relative to the vacuum cap and not be properly positioned and deposited on the chute. Many things could cause these problems; for example, when the vacuum caps begin to wear, the reliability of the gripping action decreases.

After the plastic cartons have been positioned on top of the bottles carried within the case, they have to be pressed down securely over the neck of the bottle in order to produce a secure package. In one particular machine, a roller having recesses in its periphery is used for pressing the plastic cartons down over the top of the bottles. One problem encountered with this method is that if the roller is not properly positioned relative to the bottles carried in the case, the carton and, in particular, a portion of the carton extending around the end bottles will not be pressed down over the bottles the entire extent and when the package is lifted, the loose bottles will drop out of the package.

In our co-pending application, Ser. No. 06/205,194, there is disclosed a machine which is provided for placing the cartons on top of bottles loaded in a case. These cartons are fed from a plurality of stacks of cartons and allowed to flow down by gravity a chute which terminates adjacent the top of a case of bottles. As the bottles in the case flow therebelow, it engages cartons and pulls the cartons over the bottles. A presser foot is then used for pressing the cartons down over the top of the bottles. While the device disclosed in our co-pending application works satisfactorily, it has been found that it is desired to have a more positive gripping action when removing the cartons from the plurality of stacks. In our co-pending device, movable fingers are inserted through holes provided in the carton and projections extend outwardly therefrom to be positioned between the last carton and the next to the last carton. Once the projections extend laterally outwardly from the fingers, the fingers are retracted and the last carton is deposited on the inclined chute. If the main body portion of the cartons are jammed tightly together, it sometimes becomes difficult to separate the last carton in the stack from the next to the last carton and more than one carton will be dispensed from the stack at a time.

SUMMARY OF THE INVENTION

In order to positively grasp the last carton in the stack and remove it from the stack for depositing it on the inclined chute, a modified form of picker fingers from that shown in our co-pending application, is utilized. The fingers constructed in accordance with the present invention can be used for removing, to applicant's knowledge, all of the cartons presently being used for securing six articles, such as drinks, together. The cartons each have a main body portion with an edge positioned therefrom. It is desired that the cartons which are carried in a plurality of stacks be removed in succession from the stacks and deposited on an inclined receiver so that they can be fed in succession to be placed on the articles carried in a case.

The stacks of cartons are carried on an inclined chute which has a bottom and an open lower end. An abutment is carried adjacent the lower end of the chute which engages the last carton carried therein for maintaining the stack on the chute. A support member is provided for supporting at least one picker finger for each stack of cartons and, in the preferred embodiment, there are two picker fingers provided for removing each carton from respective stacks.

A power-operated cylinder is provided for moving the support member to and from the end of the chute between a gripping position and a carton depositing position.

The picker fingers include a power-operated cylinder which has a piston rod extending out a lower end of the cylinder. An enlarged gripping head is carried on a remote end of the piston rod and there is a cooperating gripping member carried between the gripping head and the lower end of the cylinder. The cylinder is mounted on support member so that the axis of the piston rod is substantially perpendicular to the lower end of the chute with an edge of the last carton being positioned between the gripping head and a cooperating gripper member which, in the preferred embodiment, is a pin. As a result, when the power-operated cylinder is de-activated retracting the gripping head, it lifts the edge of the carton up over the abutment and firmly grasps the edge between the gripping head and the cooperating gripping member. When the support member is moved to the depositing position, the last carton of the stack is moved away from the stack and, upon deactivating the power-operated cylinders upon the support member reaching said depositing position, the carton is released and dropped on the inclined receiver.

Pneumatic switches are provided for activating the main power cylinder and the power-operated cylinders associated with the picker fingers for properly sequencing the operation of the cylinders for grasping the last carton and for releasing such onto the receiving member.

Accordingly, it is an important object of the present invention to provide an apparatus for removing cartons from a stack of cartons in succession.

Still another important object of the present invention is to provide an apparatus wherein picker fingers positively grip a lower carton of a stack of cartons for removing the cartons in succession from the stack.

Still another important object of the present invention is to provide a simple and reliable device for removing cartons from a stack of cartons and feeding them to an inclined receiver.

The construction designed to carry out the invention will be hereinafter described, together with other features thereof.

The invention will be more readily understood from a reading of the following specification and by reference to the accompanying drawings forming a part thereof, wherein an example of the invention is shown and wherein:

DESCRIPTION OF THE PREFERRED EMBODIMENT

Figure 1:
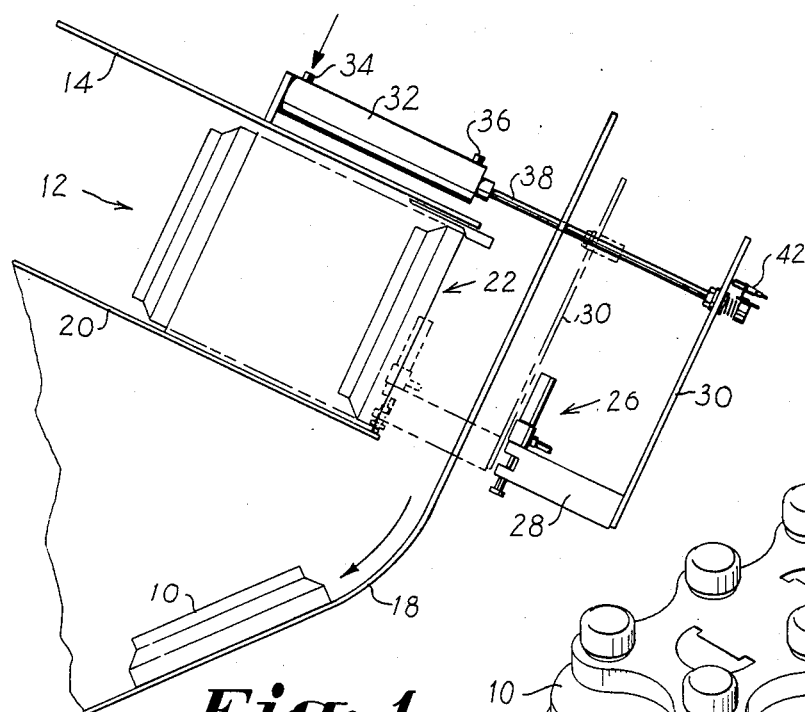
FIG. 1 is a side elevational view with parts removed for purposes of clarity illustrating the manner in which cartons are removed from a stack of cartons and fed to a receiving member.
Figure 2:
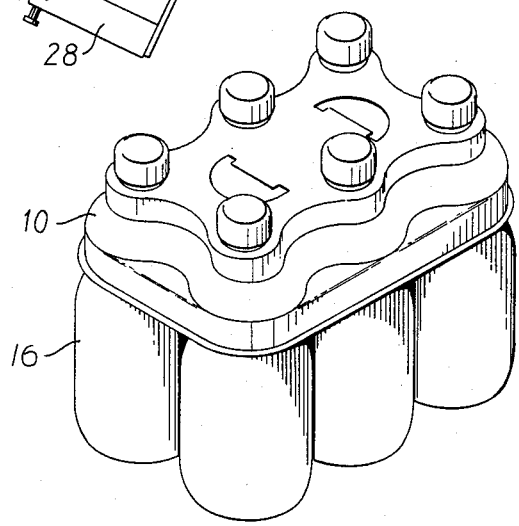
FIG. 2 is an enlarged perspective view showing a carton inserted on a plurality of bottles.
Figure 3:
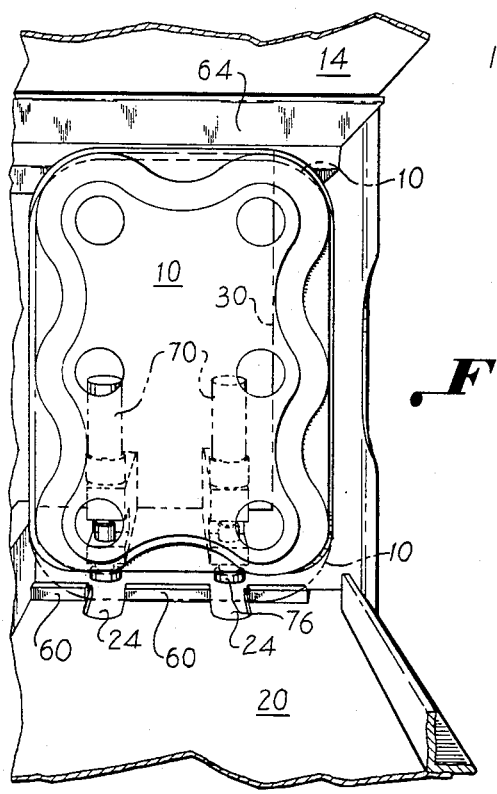
FIG. 3 is an enlarged sectional view illustrating the manner in which the picker fingers engage an edge of the carton when grasping the carton.
Figure 4:
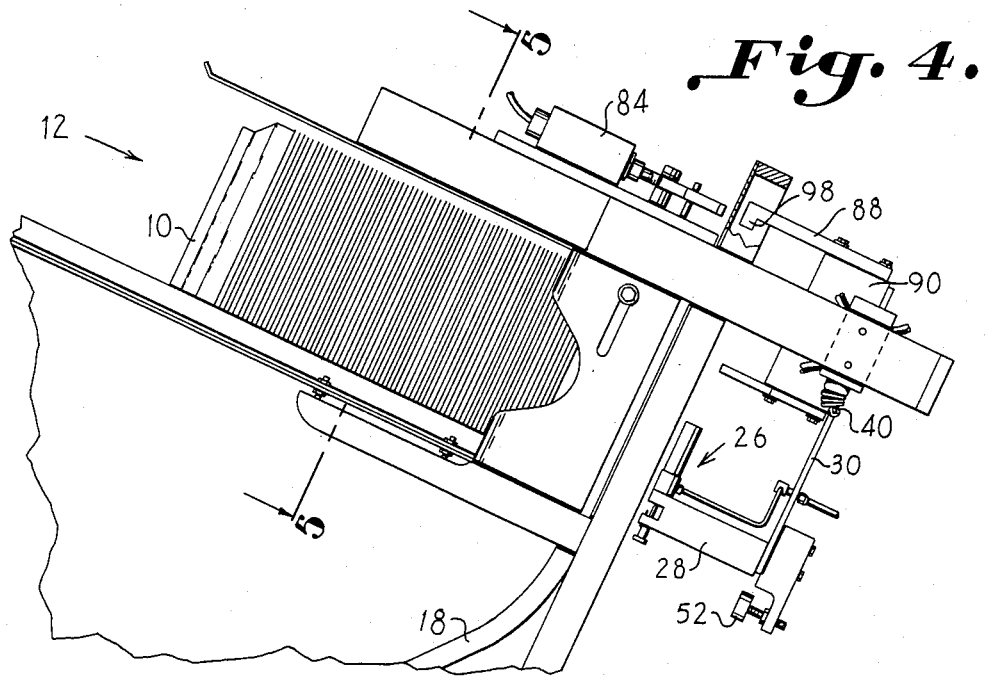
FIG. 4 is a fragmentary side elevational view partially in section illustrating a stack of cartons and mechanism for removing the cartons in succession therefrom.
Figure 5:
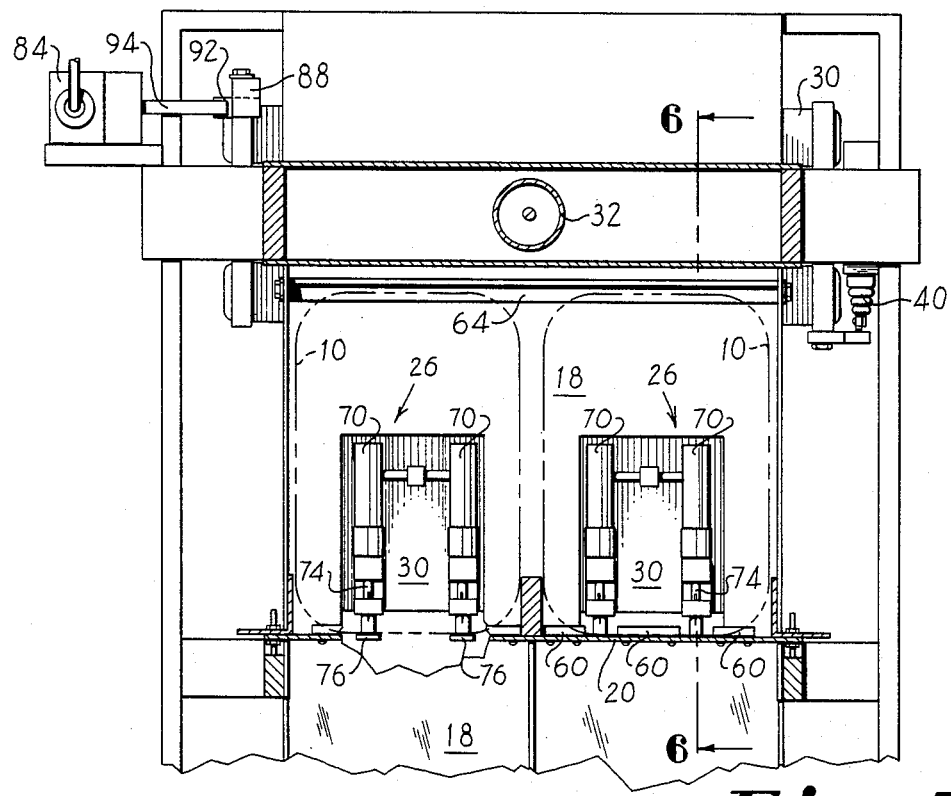
FIG. 5 is a sectional view taken along line 5—5 of FIG. 4.

Referring to FIG. 1 of the drawing, there is illustrated an apparatus for removing cartons 10 from a stack of cartons 12 that are carried on an inclined chute 14. While only a single stack 12 of cartons is shown in FIG. 1, it is to be understood that normally as shown in the other figures, the cartons are withdrawn from two stacks of cartons similar to that shown in our co-pending application Ser. No. 06/205,194. The cartons 10 are subsequently placed over the tops of articles, such as bottles 16, as illustrated in FIG. 2. It is the purpose of this invention to feed the cartons 10 in succession from the stacks 12 onto a feed chute 18 which delivers the cartons by means of gravity to a position directly above a conveyor upon which cases of drinks are being transported for being positioned on top of bottles. The chute 14 in which the stack 16 of cartons 10 is carried has a bottom 20 and an opened inner end generally designated by the reference character 22. Slots 24 are provided in the end of the bottom 20 for receiving picker fingers generally designated by the reference character 26 which are used for grasping a lower edge 62 of the carton when removing the carton from the stack. The picking fingers 26 are supported by a bracket 28 on a movable support member 30. The support member 30 is in the form of a substantially vertically extending plate. It is moved to and from a carton gripping position shown in phantom lines in FIG. 1 and a carton releasing position which is slightly forward of the position shown in full lines in FIG. 1. The support plate 30 is moved back and forth between these two positions by a power-operated means such as a pneumatically-operated cylinder 32 which has a pair of opposed ports 34 and 36 into which fluid passes. The outer end of a piston rod 38 extending out of the main power cylinder 32 is connected directly to the support plate 30 by means of threaded nuts. The flow of air to the ports 34 and 36 is under control of pneumatic switches 40 shown in FIG. 4 and 42 shown in FIG. 6. As the support member 30 is moved rearwardly, it strikes the pneumatic switch 40 to reverse the flow of air to the ports 34 and 36. On the forward stroke, the switch 42 which is mounted on the end of the piston rod strikes the rear surface 44 of the frame for limiting the forward directional movement of the plate and also for reversing the direction of flow of fluid to the cylinder 32.

Figure 6:
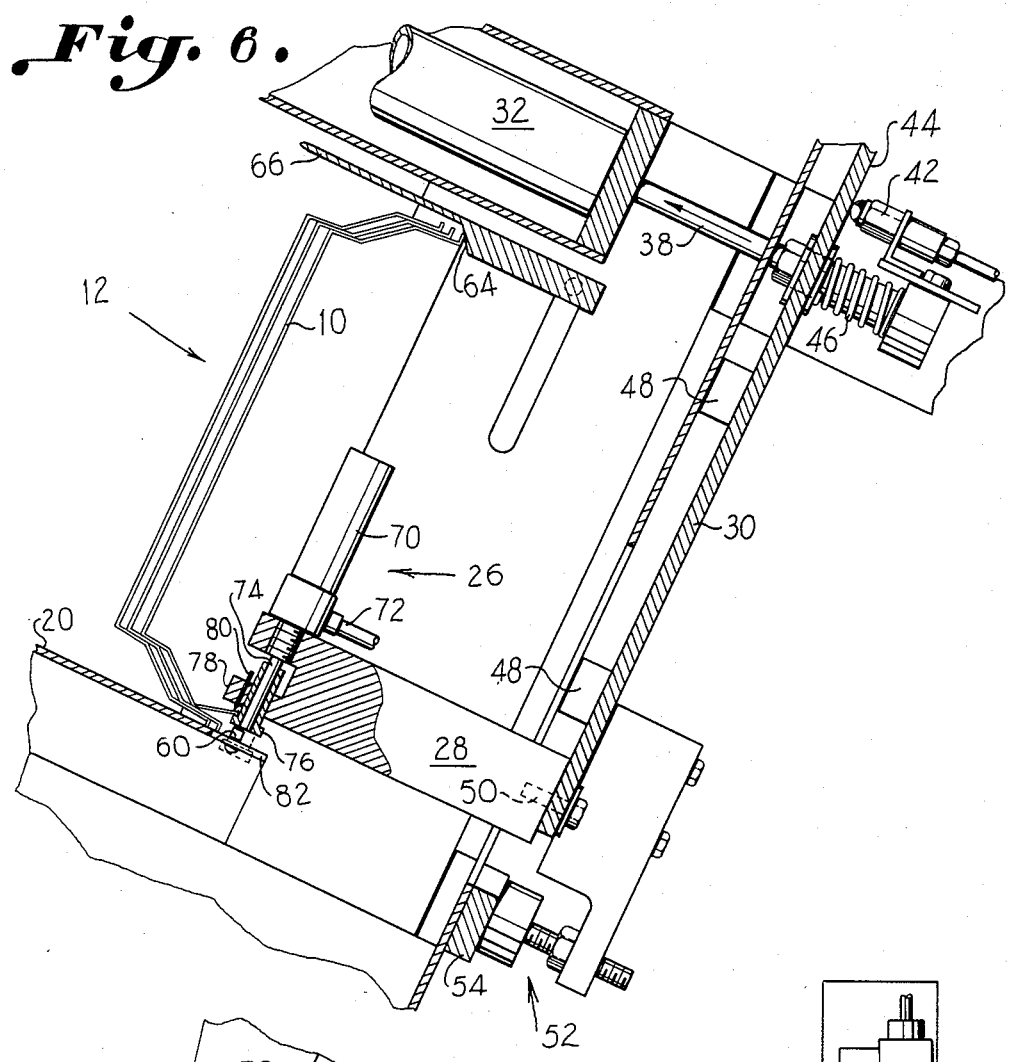
FIG. 6 is a sectional view taken along line 6—6 of FIG. 5, showing the picker fingers engaging the cartons for removing the cartons from a stack.

In FIG. 6, immediately prior to the pneumatic switch 42 being activated by compressing a spring 46 carried on the end of the piston rod 38 associated with the main cylinder 32, the movable support plate 30 strikes the abutments 48 stopping the forward movement of the support plate. However, since the piston rod 38 extends through a hole provided in the support plate 30, it compresses the spring 46 slightly until the pneumatic switch 42 is triggered reversing the direction of movement of the support plate 30. The purpose of mounting the pneumatic switch 42 on the end of the piston rod such as shown is to ensure that the support plate 30 has been moved its full desired stroke in the forward direction.

An abutment in the form of an adjustable stop 52 is carried on the lower end of the support plate 30 and strikes a stop 54 for limiting the forward movement of the lower end of the support plate 30. The prime purpose of the abutment 52 is to ensure that the bottom surface of the support plate upon which the bracket 28 is mounted is stopped at the same position on each forward stroke of the support plate 30. Note that the bracket 28 is attached to the support plate 30 by means of a bolt 50.

Figure 7:
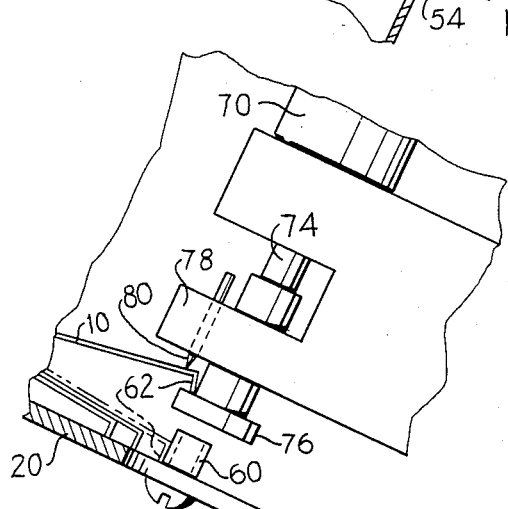
FIG. 7 is an enlarged side elevational view illustrating the picker finger of FIG. 6 in operation.

The stack of cartons 12 are maintained in the chute 14 by means of an abutment 60 which is substantially rectangular in shape as shown in FIG. 7 pressing against a lower edge 62 of a carton 10. The upper edge of the carton 10 presses against an inclined surface 64 projecting down from an upper wall 66 of the chute. In order for the last carton in the stack to be shifted as shown in FIG. 6 to the right to drop through the chute 68, it is necessary first to lift the lower edge 62 of the carton up over the abutment 60 and move the carton 10 to the right. This is accomplished by the picker finger 26. The picker finger 26 grasps the lower end of the carton, lifts it up and on the rearward stroke of the main cylinder, that is, when the support plate 30 is moved to the right as shown in FIG. 6, it pulls the carton with it.

The picker finger 26 includes a pneumatic cylinder 70 which has a port 72 provided therein for receiving pressurized fluid from any suitable source of pressure. Projecting outwardly from the cylinder 70 is a piston rod 74. An enlarged head 76 is threaded on the end of the piston rod. The cylinder 70 is secured to the bracket 28 by means of a threaded connection. The piston rod extends through an abutment 78 projecting outwardly from the bracket 28. The abutment 78 has positioned therein a pin 80 which is directed towards the enlarged head 26 carried on the end of the piston rod.

Figure 8:
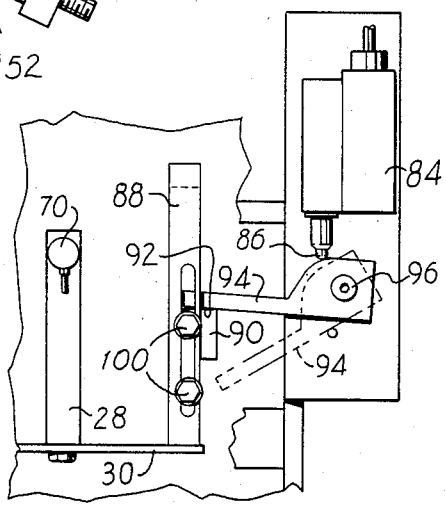
FIG. 8 is a plan view showing the switch mechanism for controlling the activation and de-activation of the power-operated cylinders associated with the picker fingers.

It is noted that the lower end of the bottom 22 of the chute has a slot 24 provided therein which permits the enlarged head 76 to pass from below the bottom 20 to above the bottom 20 when grasping the lower edge 62 of the carton 10. A switch 84 (see FIG. 8) is provided for activating the pneumatic cylinder 70 associated with the picker fingers. The switch 84 includes a plunger 86 which, in turn, triggers a pneumatic switch when depressed. Mounted on top of the movable support member 30 is an adjustable bracket 88 that is supported on a block 90 as shown in FIGS. 4 and 8. The block 90 has a forward leading surface 92 which strikes an arm 94 rotatably carried on a post 96 when the movable support 30 is moved to its forward position. This causes the switch 84 to supply pressurized fluid to the port 72 of the cylinder 70. When such happens, the piston rod 74 is retracted causing the lower edge of carton 10 to be pinched or grasped between the enlarged head and the pin 80 as shown in FIG. 7. When the movable support 30 is moved to its rear depositing position by the main cylinder 32, a downwardly extending flange 98 carried on the end of the bracket 88 strikes the arm 94 moving it back to the phantom position such as shown in FIG. 8 so as to de-activate the pneumatic switch 84. It is noted that the arm 94 has a camming surface provided thereon which activates and de-activates the plunger 86 associated with the switch 84.

The point where the arm 94 is rotated to the phantom line position 94 for de-activating the switch 84, can be adjusted by loosening the bolts 100 and sliding the bracket 88 relative thereto. Therefore, the position of the flange which controls the releasing of the carton removed, can be adjusted. When it is desired to adjust the exact position that the surface 92 strikes the plunger 86 for activating the cylinder 70 in order to grasp the edge of the carton, then the entire switch 84 is moved on the frame.

While a preferred embodiment of the invention has been described using specific terms, such description is for illustrative purpose only, and it is to be understood that changes and variations may be made without departing from the spirit or scope of the following claims.

What is claimed is:

1. An apparatus for feeding cartons in succession from a stack of cartons, said cartons being substantially rectangular in shape with an edge wall extending therearound, said apparatus comprising:
    a support plate;
    a plurality of picker fingers carried on said support plate;
    said picker fingers including,
        (i) a power-operated cylinder;
        (ii) a gripping head carried on an end of a piston rod extending out of said power-operated cylinder said gripping head including a radially extending flange and an abutment spaced from said flange whereby activation of said cylinder retracts the piston moving the flange towards the abutment for grasping a carton edge therebetween;
    means for selectively moving said support plate to and from said stack of cartons for positioning said picker fingers in a picking position adjacent an end carton in said stack;
    means for activating said power-operated cylinder causing said gripping head to be retracted to a closed position grasping an edge of said end carton,
    said means for moving said support plate and picker fingers away from said stack of cartons to a depositing position; and
    means for deactivating said power-operated cylinder releasing said end carton.

2. The apparatus as set forth in claim 1 further comprising:
    an incline chute supporting said stack of cartons;
    an abutment carried adjacent a lower end of said incline chute upon which an edge of the lowermost carton in said chute rests;
    said means for actuating said power-operated cylinder causing said gripping head to lift said edge of said lowermost carton over said abutment when said gripping head is retracted to a closed position allowing said lowermost carton to drop from said incline chute.

3. The apparatus as set forth in claim 2 further comprising:
    an inclined surface carried adjacent a top portion of the lower end of said chute for engaging the top edge of said lowermost carton for assisting in holding said stack of cartons in said chute;
    whereby when said gripping head lifts an edge of said carton over said abutment, the top edge of said carton rides over said inclined surface allowing such to drop from said chute.

4. The apparatus as set forth in claim 2 further comprising:
    said chute including an inclined bottom upon which said stack of cartons are carried;
    said abutment being carried adjacent a lower end of said bottom;
    slots provided in said bottom extending from the lower end of said bottom upward beyond said abutment;
    means for supporting said picker fingers so that when said picker fingers are in said picking position said piston rods extend through said slots with said gripping head being positioned below said bottom and said cylinder being positioned above said bottom;
    whereby when said gripping heads are retracted they grasp said edge of said lowermost carton lifting said edge over said abutment.

5. The apparatus as set forth in claim 1 further comprising:
    pin means projecting outwardly from said abutment towards said flange carried on the end of said piston engaging said edge of said end carton when said piston rod is retracted for positively gripping said carton.

6. An apparatus for feeding cartons in succession from a stack of cartons, said cartons having a main body portion with an edge positioned therefrom, said apparatus comprising:
    an elongated chute having a bottom and an opened lower end;
    an abutment carried adjacent said lower of said chute engaging the last carton carried in said stack for maintaining said stack on said chute;
    a support member;
    at least one picker finger carried by said support member;

means for moving said support member to and from said end of said chute between a carton gripping position and a carton depositing position;
said picker finger including,
(i) a power-operated cylinder;
(ii) a piston rod extending out a lower end of said cylinder;
(iii) an enlarged gripping head carried on a remote end of said piston rod and
(iv) a cooperating gripping member carried between said gripping head and said lower end of said cylinder,
means for mounting said cylinder on said support member so that the axis of said piston rod is substantially perpendicular to the lower end of said chute so that an edge of said last carton is between said gripping head on said cooperating gripping member when said support member is in said carton gripping position;
means for activating said power-operated cylinder for retracting said gripping head lifting said edge of said carton up over said abutment and firmly grasping said edge between said gripping head and said cooperating gripping member so that when said support member is moved to said depositing position, said last carton of said stack is moved away from said stack; and
means for deactivating said power-operated cylinders when said support member reaches said depositing position for releasing said last carton.

7. The apparatus as set forth in claim 6 further comprising:
said cooperating gripping member being a pin fixed relative to said lower end of said cylinder for sticking into said edge of said lower carton when said gripping head is retracted for grasping said edge therebetween.

8. The apparatus as set forth in claim 6 wherein said means for moving said support member to and fro is a main double-acting power-operated cylinder having fluid ports adjacent opposed ends thereof;
a source of pressurized fluid;
means for selectively supplying said pressurized fluid to said ports of said main power-operated cylinder for moving said support member between said carton gripping position and said carton depositing position.

* * * * *